United States Patent

Trott

[15] 3,659,255
[45] Apr. 25, 1972

[54] HYDROPHONE CALIBRATOR

[72] Inventor: Winfield James Trott, 3907 Meno Drive, Doraville, Ga. 30340

[22] Filed: Sept. 25, 1969

[21] Appl. No.: 861,086

[52] U.S. Cl. ......................... 340/5 C, 73/1 DV, 181/0.5 AP, 340/8 R
[51] Int. Cl. ....................................................... H04b 11/00
[58] Field of Search................ 340/5 C, 8 R, 10; 181/0.5 AP; 73/1 DV

[56] References Cited

UNITED STATES PATENTS 3,121,211  2/1964  Eskin et al. ................. 340/8

OTHER PUBLICATIONS

McMahon, Jour. Acous. Soc. Amer., Dec. 1964, pp. 2311–2315

Primary Examiner—Richard A. Farley
Attorney—Cushman, Darby & Cushman

[57] ABSTRACT

A compact, complete, portable hydrophone calibrator or tester suitable for evaluating or calibrating a hydrophone and particularly for checking the sensitivity of a hydrophone. In the embodiment described below, the hydrophone is placed in a water-filled chamber which is surrounded by a first piezo-ceramic cylinder which acts as a sinusoidal pressure source and a second piezo-ceramic cylinder which, together with the hydrophone, receives the sound produced by the first cylinder. The output of the second cylinder and the hydrophone are compared to determine the sensitivity of the hydrophone, after the second cylinder is calibrated by the introduction of a step pressure change to set the absolute calibration level in dB relative to 1 volt per microbar.

18 Claims, 2 Drawing Figures

INVENTOR
WINFIELD JAMES TROTT

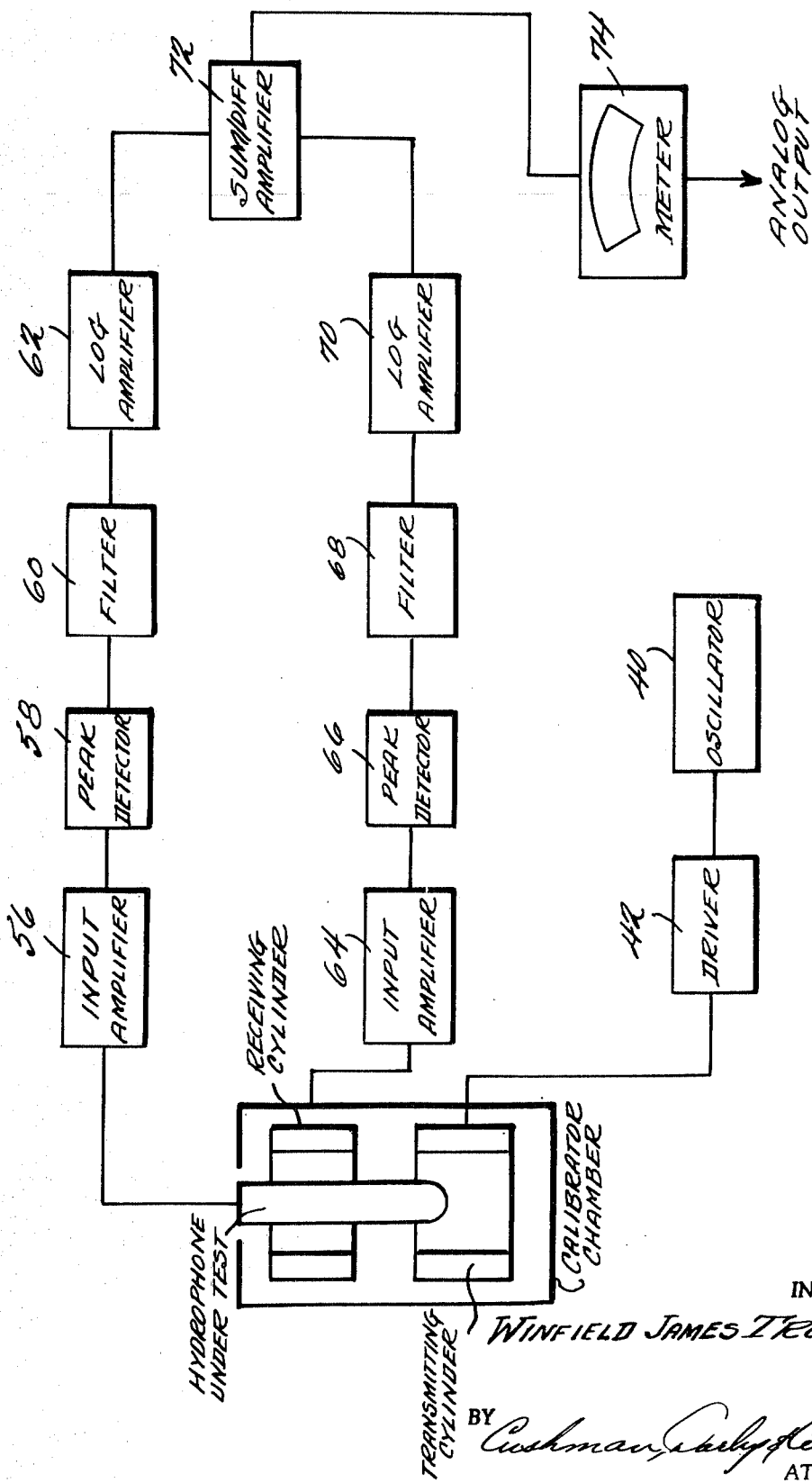

HYDROPHONE CALIBRATOR

BRIEF DESCRIPTION OF THE PRIOR ART AND SUMMARY OF THE INVENTION

The invention relates to novel hydrophone calibrator for evaluating and calibrating hydrophones.

Since bodies of water, such as oceans, are highly absorbent to light and other electromagnetic radiation but not to sound waves, the science of acoustics has become increasingly important in transmitting underwater information and in extending our knowledge of the seas. Acoustical methods have been found useful in many diverse applications from locating submarines to determining the physical structure of the ocean bottom and organisms found thereon.

Transducer is a term widely used to designate a broad category of devices which are used for the generation and/or reception of underwater sound. The term projector is commonly applied to a generator of sound, while hydrophone refers to a receiver. Generally, a projector converts electrical energy to motional, mechanical energy which is imparted as acoustical waves to a body of water, while a hydrophone converts such waves when, received as mechanical energy, into electrical energy in wave forms which can then be recorded and analyzed. Many transducers are capable of operating both as a hydrophone and as a projector.

To insure that data obtained with hydrophones is accurate, it is necessary to continually re-evaluate and test the hydrophones to make sure that the performance of each is within designated limits and to remove those hydrophones which are performing unsatisfactorily. Such checks are preferably made at frequent intervals and accordingly there is great need for a simple, accurate, economical device which can be easily mounted aboard a ship and which can quickly and simply establish or verify the calibration of a hydrophone, preferably in the frequency range where degradation is most apt to appear.

Techniques for checking hydrophones currently in use have all proved too complex, too uneconomical or too inaccurate. For example, the two-projector-null method, while relatively accurate, requires far too complex circuitry and measurements to be a practical procedure for normal checking. The vibrating column of water method is limited in its frequency range. Reciprocity calibration in a free field is also limited at the low frequency by the depth of the water and is likewise a complex measurement.

The present invention relates to a simple method and apparatus for evaluating or calibrating a hydrophone wherein the hydrophone is simply inserted into a water-filled calibrating chamber located within two piezoceramic cylinders mounted along substantially the same axis. One of the cylinders acts as a sinusoidal pressure source and is preferably driven through the frequency range of interest by a variable frequency oscillator. The other receiving piezo-ceramic cylinder is preferably calibrated before testing each hydrophone by means of a step change in hydrostatic pressure so as to set the absolute calibration level in dB relative to 1 volt per microbar. The ratio of the output of the hydrophone being tested to the output of the receiving cylinder in dB yields the sensitivity of the hydrophone.

Many other objects and purposes of the invention will become clear from the following detailed description of the drawings.

BRIEF DESCRIPTION OF THE DRAWINGS

FIG. 2 shows a block diagram of the hydrophone calibrator and the electrical elements for producing an indication of the sensitivity of the hydrophone tested.

DETAILED DESCRIPTION OF THE DRAWINGS

Figure 1:
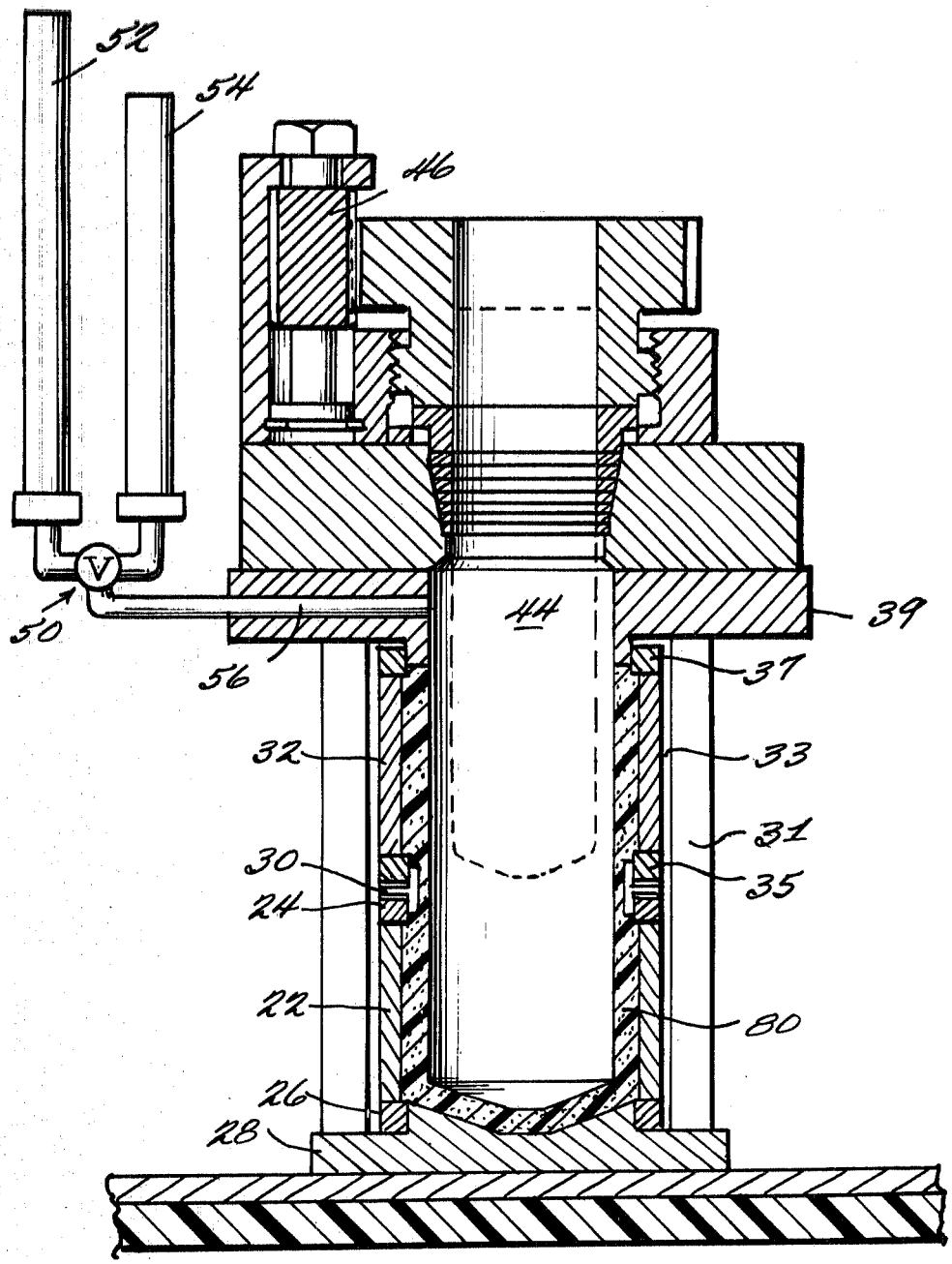
FIG. 1 shows a cut-away view of the novel hydrophone calibrator of this invention.

Reference is now made to FIG. 1 which shows a cut-away view of the novel hydrophone calibrator or tester of this invention. As mentioned briefly above, this calibrator is intended to be a complete, compact, portable unit, which is preferably packaged in a suitcase style carrying case so as to be easily manageable and to be convenient to wherever hydrophones need testing. The device can be bench-mounted for shipboard use or can be otherwise mounted however desirable.

Further, the unique hydrophone tester shown in FIGS. 1 and 2 has been particularly designed for the calibration of hydrophones in a frequency range of 1 Hz to 5 KHz, which is the range in which degradation is most likely to appear, although testing outside this preferred range is of course possible. This device is an absolute calibrating device for measuring the sensitivity of a hydrophone in volts per microbar, which is the free field voltage sensitivity, so long as the hydrophone volume compliance is no greater than the volume compliance of the water displaced by the hydrophone. Most hydrophones at the low frequency range for which this device is particularly designed satisfy this compliance condition.

The arrangement shown in FIGS. 1 and 2 is a complete system consisting of a source of sinusoidal pressure of known magnitude in a closed chamber, an electronic drive for the source and receiving circuitry. The source of pressure in the embodiment shown in FIGS. 1 and 2 is simply a piezo-ceramic cylinder 22 which is mounted about the area into which the hydrophone is inserted for testing. Cylinder 22 is mounted between two rubber ring seals 24 and 26 which serve to hold it firmly in place. Seal 26 is attached to a bottom plate 28 while seal 24 connects to a division ring 30 between the transmitting cylinder 22 and the measuring cylinder 32 which is a likewise piezo-ceramic cylinder preferably identical to cylinder 22. An exterior supporting tube 31 surrounds both cylinders 22 and 32 and also provides an air filled chamber 33 around the two cylinders 22 and 32. Rubber ring seals 35 and 37 hold cylinder 32 in place and ring seal 37 connects to upper plate 39 as shown in FIG. 1.

At low frequencies, the transmitting piezo-ceramic cylinder 22 is essential a capacitor driving a mechanical compliance to which the piezo-ceramic receiving cylinder 32 is coupled. Receiving cylinder 32 is also substantially a capacitance at these frequencies. A constant voltage drive of, for example, 10 volts thus produces an open circuit output voltage at receiving cylinder 32 of, for example, −18 dB relative to 1 volt per microbar at frequencies up to about 500 Hz.

Above this frequency, the chamber impedance is no longer a true compliance due to the approaching longitudinal resonance. Thus, the 10-volt drive in effect produces a sound pressure in the chamber that increases with frequency. At the chamber resonance, the pressure is about 17 dB above the level at frequencies below 500 Hz. The receiving cylinder 32, however, continues to measure the sinusoidal pressure in the region of the hydrophone's active elements, and for this reason, the ratio of the hydrophone output voltage to the output voltage of the receiving cylinder 32 as shown on a D.C. meter or as recorded on a strip chart recorder is used as a measure of sensitivity rather than the absolute output level of the hydrophone being tested.

A typical conventional hydrophone is calibrated as follows. First, the hydrophone being tested is inserted into the hollow test chamber 44 which is filled with water, castor oil or similar liquid. A lever-operated clamping ring preferably seals the chamber for up to 1,000 psi and a pinion gear 49, which is illustrated in FIG. 1, is included to accomplish that sealing. Then, piezo-ceramic cylinder 22 is driven by a conventional oscillator 40, as shown in FIG. 2, through a conventional driver circuit 42. Oscillator 40 may be simply a variable frequency, three decade oscillator capable of producing at least 10 volts rms.

The operator next introduces a precision pressure step change of, for example, 10,000 microbars to set the absolute calibration level in dB relative to 1 volt per microbar. This is accomplished by switching the manometer tube connected to the interior of the hydrophone chamber 44. For example, when the conventional switch 50 is operated to disconnect manometer 54 and to connect manometer 52, which is roughly 10 centimeters higher than the manometer 54 to the line 56, which connects to the chamber 44, a 10,000 microbar step pressure change in chamber 44 takes place. The output of oscillator 40 can then be adjusted to generate a sinusoidal pressure and after this is accomplished the sensitivity of the hydrophone being tested versus frequency can be easily obtained by varying the frequency of the oscillator 40 over the desired frequency range.

As mentioned briefly above, the receiving peizo-ceramic cylinder 32 is mounted axially with the transmitting cylinder 22 and is preferably calibrated by a hydrostatic pressure step change such as equivalent to 10 centimeters of water height. The sensitivity of this piezo-ceramic cylinder 32 for one embodiment was found to be approximately −88 dB relative to 1 volt/microbar over the frequency range of the calibrator. Due to the change in chamber acoustical impedance as the frequency approaches the half-wave resonance of the chamber 44 the output voltages of the hydrophone being tested and the receiving ceramic cylinder 32 increase about 17 dB at frequencies above 500 KHz. For this reason, the ratio of the two output voltages is used to produce a sensitivity indication which remains constant when the sensitivity of the hydrophone in fact remains constant.

The electrical output signal from the hydrophone being tested is first routed to an input amplifier 56 and from there to a peak detector 58. The output of the peak detector 58 is passed through a filter 60 to a logarithmic amplifier 62 which produces a signal which is in effect the logarith to some convenient base of the output of the filter 60. The output of the receiving cylinder 32 is similarly passed through an input amplifier 64, a peak detector 66, a filter 68 and a logarithmic amplifier 70. The outputs of the amplifiers 62 and 70 are applied to a sum-difference amplifier 72 and the output of the amplifier 72 is displayed on a conventional D.C. meter 74. The output of the meter can also be applied to any other suitable circuitry and, of course, represents the analog D.C. value of the output of amplifier 72. Thus, the output of amplifier 72 is in effect a function of the ratio of the output voltages of the receiving cylinder 32 and the hydrophone being tested. From this ratio function, the sensitivity of the hydrophone can be checked over the frequency range of interest, which, as mentioned, briefly above, is normally 1 Hz to 5 KHz.

The two ceramic cylinders 22 and 32 can be potted in polyurthane or silicone resin, if desired. Further the cylinders can be shielded from the conductivity of the water within the cavity 44 in which the hydrophone is placed by means of a rubber boot, butyl or neoprene. In FIG. 1, a polyurethane liner 80 separates the chamber 44 from the cylinders 22 and 32. Means can also be provided for varying the temperature and hydrostatic pressure within chamber 44 or otherwise calibrating or testing hydrophones at other than ambient conditions.

As mentioned above, there are a number of defects which can occur in the hydrophone which substantially affect the accuracy of data obtained with it. For example, a piezo-electric hydrophone with pre-amplifier output will normally have a constant free field voltage sensitivity over a broad frequency range below the first resonance. At very low frequencies, the capacitive reaction to the piezo-electric crystal or ceramic element will normally equal the electrical leakage resistance across it and the sensitivity will be roughly −3 dB relative to the constant sensitivity at higher frequencies. Sensitivity at lower frequencies will continue to drop 6 dB per octave. If moisture has penetrated to the piezo-electric element, however, then the low frequency cut-off will substantially increase and this form of degradation can be easily detected by the novel calibrator of this invention.

Further, some piezo-electrical elements, such as those made with Ammonium Dihydrogen Phosphate, require that the surface normal to two of the coordinate axes be isolated from the sound field, and this is sometimes accomplished by cementing a pressure release material on these surfaces. If the hydrophone element is enclosed in an oil-filled boot, then the oil may eventually saturate the pressure release material, reducing the isolation and lowering the sensitivity. This failure will also be detected by the calibrator of this invention.

In an oil coupled construction, the oil is carefully deareated during construction. The presence of small air bubbles in the oil due to poor construction or subsequent leakage of air into the oil will produce spurious resonances. For example, a bubble resonating at 2,500 Hz (0.1 inch diameter) will affect the hydrophone sensitivity 2 or 3 dB at resonance and will lower the output voltage of the calibrator by about 1 dB below resonance. Smaller bubbles, which resonate at higher frequencies will produce a lesser effect. Failure due to poor cement bonds that reduce the accoustic coupling or fractured piezoelectric elements that reduce the element capacitance will lower the sensitivity within the range of the calibrator and be thus detected.

Sensitivity above the range of the calibrator will generally remain constant except for diffraction effects and resonances of the element and hydrophone structure, both a function of hydrophone dimensions. Degradation in this upper frequency range can often be detected as degradation within the frequency range of the calibrator, a far simpler method than measurement in a free field.

Thus this novel hydrophone described above is portable, compact, complete and capable of determining sensitivity over a wide frequency range, for example, 1 Hz to 5 KHz is also capable of quickly and simply detecting defective hydrophones or deteriorated performance and eliminates the necessity for returning such hydrophones from the field to the lab for calibration. As mentioned briefly, an external recorder can also be associated with the equipment to provide a hard copy of calibration data. Further, ambient pressure in the chamber can be varied, if desired, from 0 to 1,000 psi or higher by attaching a nitrogen or air bottle with regulator to a standard fitting on the calibrator.

Many changes and modifications from the novel hydrophone of this invention are indeed possible without departing from the spirit of the invention. Accordingly, the scope of the invention is intended to be limited only by the scope of the appended claims.

What is claimed is:

1. A hydrophone testing apparatus comprising:
   chamber means having a cylindrically shaped interior cavity for receiving the hydrophone to be tested, and adapted to be filled with a liquid, and having an inner cylindrical wall bounding said cavity
   a first cylindrical tube of piezo-ceramic material forming part of said inner wall and extending about said cavity for imparting sound to said liquid,
   a second cylindrical tube of piezo-ceramic material forming part of said inner wall and extending about said cavity axially aligned with said first tube for receiving the sound imparted to said liquid by said first tube, and producing a first electrical signal,
   means for producing a second electrical signal from the sound received by said hydrophone being tested and
   means for comparing said first and second electrical signals to test said hydrophone.

2. Apparatus as in claim 1 including means for shielding the ends of said tubes.

3. An apparatus as in claim 1 wherein said liquid is water.

4. An apparatus as in claim 1 including means for producing a step change of pressure in said chamber means to calibrate said second tube.

5. An apparatus as in claim 4 wherein said producing means includes a first and second manometer having a given differential level and valve means for switching the liquid in said chamber means from one manometer to the other manometer to produce said step change.

6. An apparatus as in claim 5 wherein said given level is 10 centimeters and said step change is 10,000 microbars.

7. Apparatus as in claim 1 wherein said comparing means includes means for producing a signal which is a function of the ratio of said first and second signals.

8. Apparatus as in claim 1 wherein said comparing means includes a first peak detector for receiving said first signal, a first logarithmic amplifier for receiving the output of said first peak detector and producing a third signal, a second peak detector for receiving said second signal, a second logarithmic amplifier for receiving the output of said second peak detector and producing a fourth signal, and a summing amplifier for receiving said third and fourth signals and producing a fifth signal which is a function of the ratio of said first and second signals.

9. Apparatus as in claim 8 including a D.C. meter for displaying said fifth signal.

10. Apparatus as in claim 1 wherein said comparing means includes means for determining the sensitivity of said hydrophone.

11. An apparatus as in claim 1 including oscillator means connected to said first tube for causing said tube to impart said sound to said liquid.

12. An apparatus as in claim 11 including means to vary the frequency of said oscillator.

13. A hydrophone testing apparatus comprising:
chamber means having a cylindrically shaped interior cavity for receiving the hydrophone to be tested and adapted to be filled with a liquid and having an inner cylindrical wall bounding said cavity,
a first cylindrical tube of piezo-ceramic material forming part of said inner wall and extending about said cavity for imparting acoustical vibrations to said liquid,
a second tube of piezo-ceramic material forming part of said inner wall and extending about said cavity axially aligned with said first tube for receiving the sound imparted to said liquid by said first tube and producing a first electrical signal,
variable oscillator means connected to said first tube for causing said first tube impart said vibrations to said liquid,
means for producing a second electrical signal from the vibrations received from said liquid by said hydrophone,
means for calibrating said second tube by applying a step change in pressure to said liquid, and
means for producing a signal from said first and second signals which is a function of the ratio of said first and second signals.

14. A method of testing a hydrophone comprising the steps of:
disposing said hydrophone in chamber means having a cylindrical cavity filled with a liquid bounded by an inner cylindrical wall with first and second axially aligned cylindrical tubes of piezo-ceramic material each forming part of said wall and extending about said cavity,
electrically driving said first tube so that first tube imparts acoustical vibration to said liquid and
comparing the electrical signals produced by said second tube with the electrical signals produced by said hydrophone.

15. A method as in claim 14 including the steps of calibrating said second hydrophone by applying a step change in pressure to said liquid.

16. A method as in claim 14 including the step of varying the frequency of the signal driving said first tube so as to obtain the sensitivity of said hydrophone over a given frequency range.

17. A method as in claim 14 wherein said step of comparing includes the step of producing an electrical signal which is a function of the ratio of said signals produced by said hydrophone and said signals produced by said second tube.

18. A method as in claim 17 wherein said step of producing includes the steps of applying the signals produced by said hydrophone to a first peak detector, applying the output of said first peak detector to a first logarithmic amplifier, applying the signals produced by said second tube to a second peak detector, applying the output of said second peak detector to a second logarithmic amplifier, and applying the outputs of said first and second logarithmic amplifiers to a summing amplifier to produce a signal which is a function of the ratio of the signals from said hydrophone and the signals from said second ring.

* * * * *